B. F. JOSLYN
Revolver.
No 39,406    Patented Aug. 4, 1863.
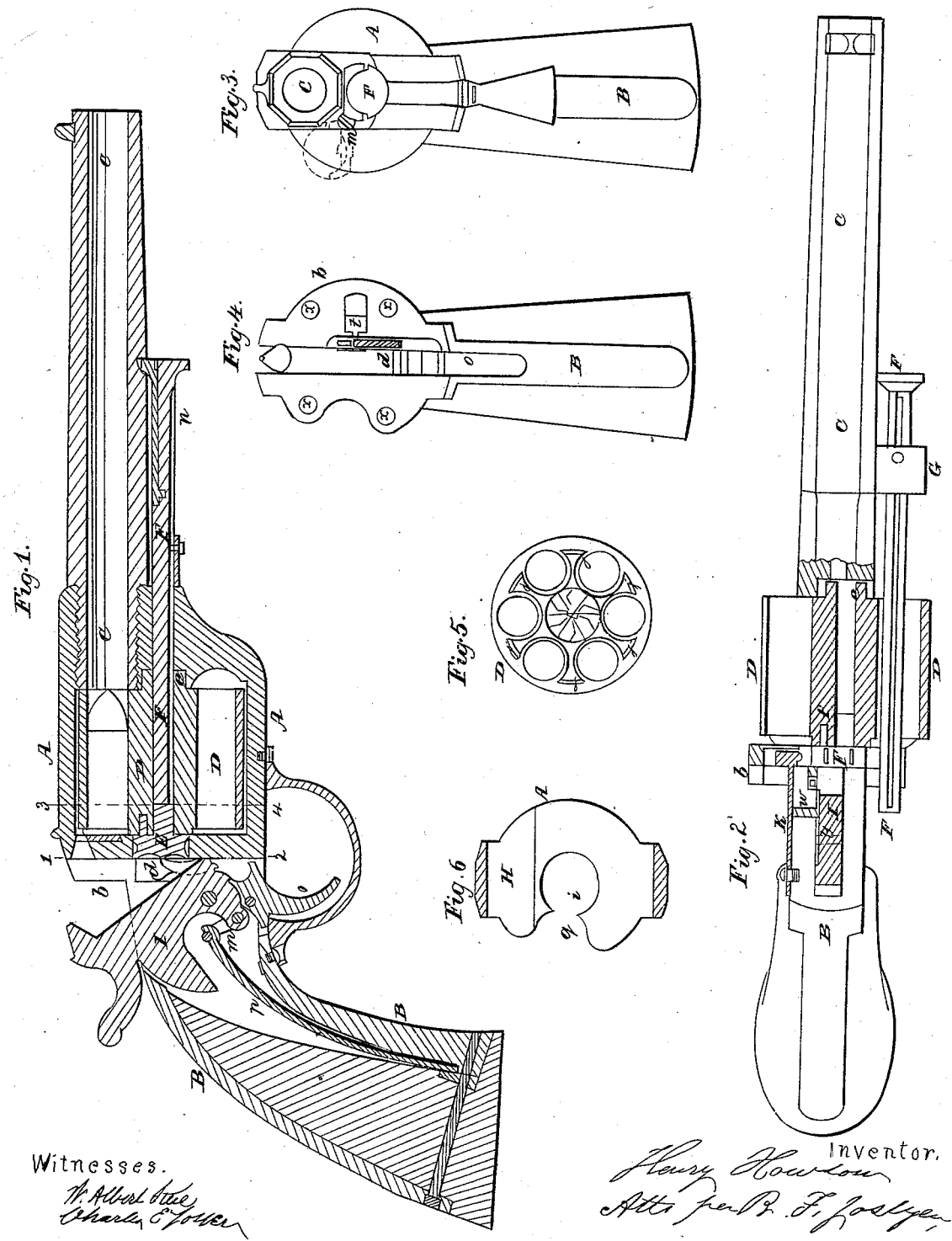

UNITED STATES PATENT OFFICE.

BENJ. F. JOSLYN, OF STONINGTON, CONNECTICUT.

IMPROVEMENT IN REVOLVING FIRE-ARMS.

Specification forming part of Letters Patent No. 39,406, dated August 4, 1863.

*To all whom it may concern:*

Be it known that I, BENJAMIN F. JOSLYN, of Stonington, New London county, Connecticut, have invented certain Improvements in Revolving Fire-Arms; and I do hereby declare the following to be a full, clear, and exact description of the same, reference being had to the accompanying drawings, and to the letters of reference marked thereon.

My improvements consist, first, in a peculiar manner, described hereinafter, of constructing the stock and frame of a revolver in two pieces detachable from each other, so as to afford ample facilities for the fitting and adjusting of the hammer, trigger, mainspring, &c., and for readily effecting repairs; secondly, in a block having teeth at the rear, and being so adapted to the cylinder and the frame that it can be forced from the former and through the latter when the cylinder has to be withdrawn from the said frame; thirdly, in a device, described hereinafter, for locking the cylinder and for maintaining it locked at all times, excepting when the dog is in the act of revolving the said cylinder during the cocking of the hammer; fourthly, in a rod hung to an arm which is hinged to the barrel, the said rod being arranged in respect to the cylinder, as described hereinafter, so that it may serve the twofold purpose of a center-pin and an instrument for forcing the spent cartridges from the bores of the cylinder.

In order to enable others skilled in the art to make and use my invention, I will now proceed to describe its construction and operation.

On reference to the accompanying drawings, which form a part of this specification, Figure 1 is a longitudinal section of my improved revolving fire-arm; Fig. 2, a plan view, partly in section; Fig. 3, an end view; Fig. 4, a transverse section on the line 1 2, Fig. 1, the barrel and frame being removed; Fig. 5, an end view of the cylinder; and Fig. 6, a transverse section on the line 3 4, Fig. 1.

Similar letters refer to similar parts throughout the several views.

A represents the frame, B the stock, C the barrel, and D the cylinder, of the fire-arm.

The stock and frame are not made in one piece, as in ordinary revolving fire-arms, but are secured to each other at the point designated by the line 1 2, Fig. 1, by suitable set-screws passing through holes $r$ in the flange $b$ of the stock and screwing into the frame.

The hammer I, link $n$, mainspring P, trigger O, and dog $d$ are connected to the stock B, and are too similar to those of ordinary revolving fire-arms to need minute description.

The cylinder D has at its front end a projection, $e$, adapted to a recess in the frame, of such a form as to permit the cylinder to move laterally to the position shown in Fig. 2, and into the rear end of the cylinder is fitted a projection on the block E, which cannot turn independently of the cylinder, owing to the pin $f$. An opening, $i$, Fig. 6, is formed in the rear of the frame for the reception of the block E, the opening being of such a form as to permit the free rotation of the block, as well as a limited lateral movement of the same. On the rear of this block E are formed suitable teeth, so arranged in respect to the dog $d$ that on cocking the hammer the cylinder will be turned to the proper extent.

A rod, F, passing through the frame beneath the barrel into the cylinder, serves as the center-pin, on which the said cylinder revolves, the rod being arranged to slide freely in an arm, G, which is represented by dotted lines, Fig. 3, and hung loosely to the frame at $m$, the end of the rod being furnished with a spring, $n$, the outer end of which, fitting a depression in the under side of the barrel, serves to maintain the rod in its proper position in the central opening of the cylinder. The rear of the cylinder has a series of projections, $j$, Fig. 5, of such a shape as to form round each chamber a recess for the reception of the head or flange of the metallic cartridge, the projections bearing lightly against a breech-plate, H, secured to the inside of the frame, as seen in Fig. 6. This plate may be arranged to yield and recoil when the discharge of one of the cartridges takes place.

On the edge of the block E, at the rear of the cylinder, are as many indentations as the cylinder has chambers, and into these indentations engages a projection, $t$, on the end of a spring, K, which is secured to the side of the stock, the tendency of the spring being to maintain a portion of its projection $t$ in one or other of the said indentations. (See Fig. 2.) A small pin, $w$, passes through and is arranged to slide in the stock, one end of the pin being in contact with the spring K and the other end in contact with the side of the hammer, on which an inclined projection, $y$, is formed, the latter on elevating the hammer bearing against the pin $w$, and thereby forcing the spring outward and moving its projection $t$ clear of the indentations in the edge of the block E.

It should be understood that the inclined projection on the side of the hammer is so formed and arranged as to cause the spring K to release the cylinder during such time only as the dog $d$ is in the act of revolving the cylinder. At all other times the latter is locked by the spring and its projection $t$.

It will be seen that on withdrawing the rod or center-pin F from the cylinder the latter is at liberty to be moved laterally to an extent sufficient to allow for the introduction of the metallic cartridges into the chambers, the flange $b$ of the stock, as well as the flange of the frame, to which that of the stock is secured, being so cut away at 9, Figs. 4 and 6, as to permit the insertion of the cartridges.

When the spent cartridges have to be removed from the chamber the rod F is withdrawn from the cylinder and clear of the frame, the cylinder is moved laterally from the frame, the arm G is turned away from the barrel, and the rod F thereby brought into a proper position to be used as an instrument for forcing the spent cartridges from the chamber, as seen in Fig. 2.

When the cylinder has to be detached, which is rarely required, the stock is unscrewed from the frame, after which the block E can be driven from the cylinder by the rod F when the cylinder is at liberty.

The peculiar manner of constructing the frame and stock in two detachable parts affords more ample facilities for fitting and adjusting the hammer, trigger, mainspring, &c., and for effecting general repairs than the usual manner of constructing revolving fire-arms.

I claim as my invention and desire to secure by Letters Patent—

1. Making the frame A and stock B in two parts, the former carrying the cylinder and the latter carrying the hammer, trigger, mainspring, &c., and the two parts being secured to and rendered detachable from each other, as described, for the purpose specified.

2. The block E, adapted to the cylinder D and to the frame A, as set forth, for the purpose specified.

3. The spring K, with its projection $t$, the loose pin $w$, inclination $y$, and indented block E, the whole being arranged for joint action, as and for the purpose described.

4. The arm G, hinged to the barrel, and the rod F, both being so arranged in respect to the cylinder and the bores of the same that the said rod may serve the twofold purpose of a center-pin and an instrument for forcing the spent cartridge from the bores, as described.

In testimony whereof I have signed my name to this specification in the presence of two subscribing witnesses.

B. F. JOSLYN.

Witnesses:
 N. B. PALMER, 2d,
 O. B. GRANT.